(12) United States Patent
Kamada et al.

(10) Patent No.: US 11,422,108 B2
(45) Date of Patent: Aug. 23, 2022

(54) TEMPERATURE CONTROL APPARATUS, TEMPERATURE CONTROL METHOD, GAS SENSOR, METHOD OF MANUFACTURING GAS SENSOR, AND TEMPERATURE CONTROL SYSTEM FOR GAS SENSOR

(71) Applicant: NGK SPARK PLUG CO., LTD., Nagoya (JP)

(72) Inventors: Kentaro Kamada, Nagoya (JP); Hitoshi Furuta, Nagoya (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 208 days.

(21) Appl. No.: 16/445,899

(22) Filed: Jun. 19, 2019

(65) Prior Publication Data
US 2020/0003723 A1 Jan. 2, 2020

(30) Foreign Application Priority Data
Jun. 27, 2018 (JP) .............................. JP2018-121613

(51) Int. Cl.
*G01N 27/407* (2006.01)
*G01N 27/406* (2006.01)
*F02D 41/14* (2006.01)

(52) U.S. Cl.
CPC ..... *G01N 27/4071* (2013.01); *G01N 27/4067* (2013.01); *G01N 27/4073* (2013.01); *F02D 41/1494* (2013.01)

(58) Field of Classification Search
CPC ........................ G01N 27/4065; G01N 27/4067
See application file for complete search history.

(56) References Cited

U.S. PATENT DOCUMENTS 4,472,262 A 9/1984 Kondo et al.
4,609,453 A * 9/1986 Shimomura ......... G01N 27/417
204/412

(Continued)

FOREIGN PATENT DOCUMENTS

JP 57-192849 A 11/1982
JP 11-108885 A 4/1999
(Continued)

OTHER PUBLICATIONS

Normand et al., Wolframs Demonstrations Project—Arrhenius Equations for Reaction Rate and Viscosity, downloaded Dec. 30, 2021 from https://demonstrations.wolfram.com/ArrheniusEquationsForReactionRateAndViscosity/ Published Mar. 7, 2011 (Year: 2011).*

(Continued)

*Primary Examiner* — Alexander S Noguerola
(74) *Attorney, Agent, or Firm* — Sughrue Mion, PLLC

(57) ABSTRACT

A gas sensor including a detection element section (71) including a solid electrolyte body and a pair of electrodes disposed on the solid electrolyte body, and a heater (73) for heating the detection element section (71). Inherent characteristic information is recorded in a record section (170) provided on the gas sensor or a record section provided separately from the gas sensor. The inherent characteristic information is information specific to the detection element section (71) and which allows setting of a relation between a change in the temperature of the detection element section (71) and a change in the internal resistance between the pair of electrodes.

10 Claims, 7 Drawing Sheets

(56) References Cited

U.S. PATENT DOCUMENTS 5,852,228 A * 12/1998 Yamashita .......... F02D 41/1494
73/23.32
2007/0187240 A1  8/2007 Araya et al.

FOREIGN PATENT DOCUMENTS

JP  2007-212405 A  8/2007
JP  2015-200574 A  11/2015

OTHER PUBLICATIONS

John Horwat, AP Physics 1 Online—Graph Linearization, downloaded Dec. 30, from https://sites.google.com/site/apphysics1online/appendices/2-data-analysis/graph-linearization, created 2014 (Year: 2014).*

Communication dated Nov. 2, 2021, from the Japanese Patent Office in Application No. 2018-121613.

* cited by examiner

TEMPERATURE CONTROL APPARATUS, TEMPERATURE CONTROL METHOD, GAS SENSOR, METHOD OF MANUFACTURING GAS SENSOR, AND TEMPERATURE CONTROL SYSTEM FOR GAS SENSOR

BACKGROUND OF THE INVENTION

1. Field of the Invention

The present invention relates to a temperature control apparatus, a temperature control method, a gas sensor, a method of manufacturing a gas sensor, and a temperature control system for a gas sensor.

2. Description of the Related Art

Conventionally, a gas sensor has been used for detecting the concentration of a particular component (for example, oxygen) contained in exhaust gas discharged from an internal combustion engine. The gas sensor has a gas sensor element provided therein. The gas sensor element includes an oxygen concentration detection cell and an oxygen pump cell which are stacked together and each of which is composed of a solid electrolyte body and a pair of electrodes. In a gas sensor of such a type, at the time of measurement, the oxygen concentration within a measurement chamber is adjusted by pumping oxygen within the measurement chamber. This is done by using an oxygen pump cell such that a voltage generated between the electrodes of the oxygen concentration detection cell in accordance with the oxygen concentration of exhaust gas within the measurement chamber assumes a predetermined value. Further, the oxygen concentration in the exhaust gas which is proportional to the pumping current flowing through the oxygen pump cell is detected linearly.

[Patent Document 1] Japanese Patent Application Laid-Open (kokai) No. 2007-212405

3. Problems to be Solved by the Invention

Incidentally, when this kind of technique is used, the detection output of the oxygen concentration detection cell changes with the temperature of the solid electrolyte body. Therefore, in order to increase the detection accuracy, the oxygen concentration detection cell is controlled to a predetermined temperature. Specifically, since there is a correlation between the temperature of the solid electrolyte body and the internal resistance Rpvs thereof, temperature control is performed based on a relational expression which embodies the correlation such that the internal resistance Rpvs of the solid electrolyte body assumes a predetermined value.

However, since the relation between the temperature and internal resistance Rpvs of the solid electrolyte body differs among individual gas sensors because of individual differences, when the above-mentioned control is performed without considering the individual differences, a problem of lowering the detection accuracy arises.

Patent Document 1 proposes a technique of performing correction of individual differences among gas sensors. However, the technique proposed in Patent Document 1 can not accurately specify, on a gas sensor by gas sensor basis, the "relation between the temperature and internal resistance Rpvs of the solid electrolyte body" which differs among gas sensors.

The present invention has been accomplished in order to solve the above-described problem, and an object thereof is to provide a technique of accurately specifying the relation between the temperature of a detection element section of a gas sensor and the internal resistance of the detection element section between its paired electrodes, as a relation specific to the gas sensor.

SUMMARY OF THE INVENTION

The above object has been achieved, in a first aspect of the invention, by providing (1) a temperature control apparatus for controlling temperature of a gas sensor including a detection element section and a heater for heating the detection element section, the detection element section including a solid electrolyte body and a pair of electrodes disposed on the solid electrolyte body, wherein the gas sensor has a record section in which inherent characteristic information is recorded, the inherent characteristic information being information specific to the detection element section and which allows setting a relation between a change in temperature of the detection element section and a change in internal resistance of the detection element section between the pair of electrodes, wherein the temperature control apparatus comprises:

a relational expression storage section for storing a relational expression which represents a relation between the temperature and internal resistance of the detection element section and is set based on the inherent characteristic information;

an internal resistance detection section for detecting the internal resistance between the pair of electrodes; and an energization control section for controlling energization of the heater based on the relational expression and the internal resistance detected by the internal resistance detection section.

In the temperature control apparatus (1) above, the relational expression representing the relation between the temperature and internal resistance of the detection element section is set based on the inherent characteristic information (which is specific to the gas sensor and which allows setting of the relation between a change in the temperature of the detection element section and a change in the internal resistance between the pair of electrodes) recorded in the record section of the gas sensor to be controlled is stored in the relational expression storage section. Therefore, the "relation between the temperature and internal resistance of the detection element section" which is specific to the gas sensor which is to be controlled can be accurately specified based on the relational expression stored in the relational expression storage section. Since the energization control section can control the energization of the heater based on the relational expression and the internal resistance (the internal resistance between the pair of electrodes) detected by the internal resistance detection section, it is possible to accurately control energization of the heater so as to heat the detection element section to a desired temperature, once the relation specific to the gas sensor to be controlled (the relation between the temperature of the detection element section and the internal resistance between the pair of electrodes) is accurately specified and the internal resistance is actually detected using the internal resistance detection section.

In a preferred embodiment (2), the temperature control apparatus (1) above further comprises a reader for reading the inherent characteristic information recorded in the record section; and a specifying section for obtaining a target resistance based on the inherent characteristic information read by the reader.

The temperature control apparatus (2) can easily and accurately read the inherent characteristic information recorded in the record section using the reader and determine a target resistance based on the inherent characteristic information. Namely, it is possible to simply and accurately perform the operation of obtaining the target resistance for attaining the desired temperature, once the relation specific to the gas sensor to be controlled (the relation between the temperature of the detection element section and the internal resistance between the pair of electrodes) is accurately specified.

In another preferred embodiment (3), the temperature control apparatus (1) above further comprises an information storage section for storing externally input information which is the inherent characteristic information recorded in the record section or information which specifies the relation between the temperature and internal resistance of the detection element section based on the inherent characteristic information; and a specifying section for obtaining a target resistance based on the information stored in the information storage section.

The temperature control apparatus (3) can store in the information storage section the inherent characteristic information recorded in the record section or information for specifying the relation between the relation between the temperature and internal resistance of the detection element section based on the inherent characteristic information and determine the target resistance based on the information stored in the information storage section. Namely, it is possible to simply and accurately perform the operation of obtaining the target resistance for attaining the desired temperature, once the relation specific to the gas sensor to be controlled (the relation between the temperature of the detection element section and the internal resistance between the pair of electrodes) is accurately specified.

In yet another preferred embodiment (4) of the temperature control apparatus of any of (1) to (3) above, the relational expression is a mathematical equation represented by an equation $Ln(Rpvs)=a\times(1/T)+b$, where Rpvs represents the internal resistance of the detection element section, T represents the temperature of the detection element section, and a and b are constants.

The inherent characteristic information is information which specifies at least values of the constants a and b.

In this case, the relation between the internal resistance Rpvs and temperature T of the detection element section in the gas sensor to be controlled can be approximated by the mathematical equation $Ln(Rpvs)=a\times(1/T)+b$. In addition, the values of the constants a and b can be specified as values specific to the gas sensor. Namely, it is possible to more simply realize a configuration which can accurately control the energization of the heater when the temperature of the gas sensor is controlled; i.e., a configuration which can control the energization of the heater based on the above formula which can more accurately specify the relation between the internal resistance Rpvs and temperature T of the gas sensor, whereby the energization of the heater can be controlled such that a desired temperature is attained.

In yet another preferred embodiment (5) of the temperature control apparatus of any of (1) to (4) above, the inherent characteristic information contains first correspondence information which represents a correspondence between a first temperature and an internal resistance of the detection element section when the temperature of the detection element section is at the first temperature, and second correspondence information which represents a correspondence between a second temperature different from the first temperature and an internal resistance of the detection element section when the temperature of the detection element section is at the second temperature.

As descried above, the inherent characteristic information contains the above-described first correspondence information and the above-described second correspondence information. Therefore, when the relational expression representing the relation between the temperature and internal resistance of the detection element section is set based on the inherent characteristic information, the relational expression becomes as an accurate expression specific to the gas sensor.

In a second aspect (6), the present invention provides a temperature control method for controlling temperature of a gas sensor including at least a detection element section and a heater for heating the detection element section, the detection element section including a solid electrolyte body and a pair of electrodes disposed on the solid electrolyte body, wherein the gas sensor has a record section in which inherent characteristic information is recorded, the inherent characteristic information being information which is specific to the detection element section and which allows setting of a relation between a change in temperature of the detection element section and a change in internal resistance of the detection element section between the pair of electrodes, wherein the temperature control method comprises:

a reading step of reading the inherent characteristic information recorded in the record section using a reader;

a relational expression setting step of setting a relational expression which represents a relation between the temperature and internal resistance of the detection element section based on the inherent characteristic information read in the reading step; and a control step of detecting the internal resistance of the detection element section using an internal resistance detection section and controlling energization of the heater using an energization control section based on the relational expression and the internal resistance detected by the internal resistance detection section.

In the temperature control method of the second aspect (6), the reading step is performed so as to read, using the reader, the inherent characteristic information (which is specific to the gas sensor and which allows setting the relation between a change in the temperature of the detection element section and a change in the internal resistance between the pair of electrodes) recorded in the record section of the gas sensor to be controlled, and the relational expression setting step is performed in order to set the relational expression representing the relation between the temperature and internal resistance of the detection element section based on the read inherent characteristic information. When such a method is used, the "relation between the temperature and internal resistance of the detection element section" which is specific to the gas sensor which is to be controlled can be accurately specified by the above-mentioned relational expression, and it becomes possible to use such a relational expression for control. In the control step, the energization of the heater can be controlled based on the relational expression and the internal resistance (the internal resistance between the pair of electrodes) detected by the internal resistance detection section. Therefore, it is possible to accurately control the energization of the heater so as to heat the detection element section to a desired temperature, once the relation peculiar to the gas senor to be controlled (the relation between the temperature of the detection element section and the internal resistance between the pair of electrodes) is accurately specified and the internal resistance is actually detected using the internal resistance detection section.

In a third aspect (7), the present invention provides a gas sensor comprising:

a detection element section including a solid electrolyte body and a pair of electrodes disposed on the solid electrolyte body; and a heater for heating the detection element section, wherein the gas sensor has a record section in which inherent characteristic information is recorded, the inherent characteristic information being information specific to the detection element section and which allows setting a relation between a change in temperature of the detection element section and a change in internal resistance of the detection element section between the pair of electrodes.

Since the gas sensor (7) has a record section for recording therein inherent characteristic information (which is specific to the gas sensor and which allows setting the relation between a change in the temperature of the detection element section and a change in the internal resistance between the pair of electrodes), the energization of the gas sensor can be controlled by utilizing the inherent characteristic information recorded in the record section. Namely, it becomes possible to accurately control the energization of the heater so as to heat the detection element section to a desired temperature, once the "relation between the temperature and internal resistance of the detection element section" is specified, which relation is specific to the gas sensor.

In a fourth aspect (8), the present invention provides a method for manufacturing a gas sensor including a detection element section and a heater for heating the detection element section, the detection element section including one or more cells each having a solid electrolyte body and a pair of electrodes disposed on the solid electrolyte body, the method comprising:

a measuring step of measuring a first temperature which is a temperature of the detection element section when the detection element section has a first internal resistance and a second temperature which is a temperature of the detection element section when the detection element section has a second internal resistance different from the first internal resistance; and a recording step of recording inherent characteristic information in a record section integrated with the gas sensor or a record section provided separately from the gas sensor based on the first and second temperatures measured by the measurement step, the inherent characteristic information being information which is specific to the gas sensor and which allows setting a relation between a change in temperature of the detection element section and a change in internal resistance of the detection element section.

The manufacturing method (8) allows the gas sensor to be manufactured so as to utilize the record section in which the inherent characteristic information (which is specific to the gas sensor and which allows setting a relation between a change in the temperature of the detection element section and a change in the internal resistance between the pair of electrodes) has been recorded. Accordingly, for the gas sensor, control utilizing the inherent characteristic information recorded in the record section can be performed. Namely, it becomes possible to accurately control the energization of the heater so as to heat the detection element section to a desired temperature, once the "relation between the temperature and internal resistance of the detection element" is specified, which relation is specific to the gas sensor.

In a preferred embodiment (9) of the gas sensor manufacturing method (8) of the fourth aspect, in the recording step, the inherent characteristic information is recorded in the record section attached to the gas sensor itself.

In this case, the inherent characteristic information representing the characteristics specific to the gas sensor itself can be recorded. As a result, the management and utilization of the inherent characteristic information can be performed simply and easily in steps subsequent to the recording step.

In a fifth aspect (10), the prevent invention provides a temperature control system for a gas sensor which comprises the gas sensor of the third aspect (7), and the temperature control apparatus of the first aspect (1).

In this case, a temperature control system which yields effects similar to those of the gas sensor of the third aspect and the temperature control apparatus of the first aspect can be realized.

Effects of the Invention

According to the present invention, for a gas sensor which includes a detection element section having a solid electrolyte body and a pair of electrodes disposed on the solid electrolyte body and a heater for heating the detection element section, the relation between the temperature of a detection element section and the internal resistance of the detection element section between its paired electrodes can be accurately specified as a relation specific to the gas sensor.

DESCRIPTION OF REFERENCE NUMERALS

Figure 1:
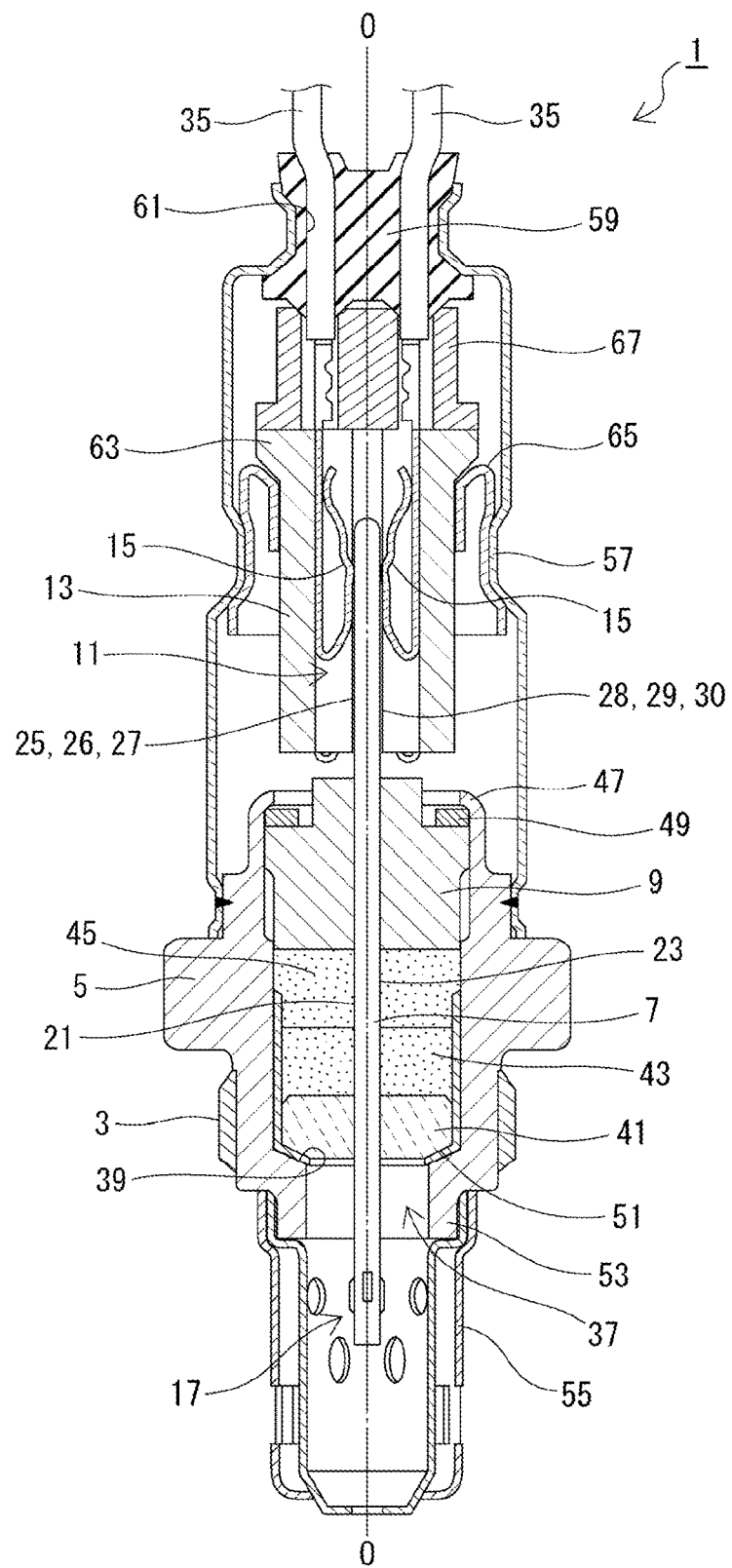
FIG. 1 is a sectional view schematically illustrating a gas sensor of a first embodiment.

Reference numerals used to identify various features in the drawings include the following.

1: gas sensor
71: detection element section
73: heater
121: second solid electrolyte portion (solid electrolyte body)
145: detection electrode (pair of electrodes)
147: reference electrode (pair of electrodes)

160, 180: temperature control apparatus
162, 192: reader
164: control section (energization control section, internal resistance detection section, specifying section)
166: storage section (relational expression storage section)
169, 190: temperature control system
170: record section
180A: control section (energization control section, internal resistance detection section, specifying section)
180B: storage section (relational expression storage section, information storage section)

DETAILED DESCRIPTION OF THE PREFERRED EMBODIMENTS

Embodiments of the present invention will next be described with reference to the drawings. However, the present invention should not be construed as being limited thereto.

The following embodiments will be described while referring to an $NO_x$ sensor, which is a type of gas sensor. Specifically, the following description will refer to a gas sensor which is attached to exhaust pipes of automobiles and internal combustion engines and includes a gas sensor element (detection element) for detecting a particular gas (nitrogen oxide $NO_x$) contained in exhaust gas to be measured.

First Embodiment 1-1. Overall Configuration of Gas Sensor

First, the overall configuration of a gas sensor 1 will be described with reference to FIG. 1.

The gas sensor 1 shown in FIG. 1 is configured as an $NO_x$ sensor and includes a tubular metallic shell 5 having a threaded portion 3 formed on its outer surface and adapted to fix the $NO_x$ sensor to an exhaust pipe; a plate-shaped gas sensor element 7 extending in the direction of an axial line O (the longitudinal direction of the gas sensor 1, the vertical direction in FIG. 1); a tubular ceramic sleeve 9 disposed so as to surround the circumference of the gas sensor element 7; a first separator 13 which has a through hole 11 extending therethrough in the direction of the axial line O and which is disposed such that the inner wall surface of the through hole 11 surrounds a rear end portion of the gas sensor element 7; and six connection terminals 15 (FIG. 1 shows only two of them) disposed between the gas sensor element 7 and the first separator 13.

The gas sensor element 7 has a rectangular-parallelepiped shape (plate-like shape) extending in the longitudinal direction, and includes a detecting section 17 provided in its forward end region and adapted to detect a particular gas (herein, $NO_x$) contained in the gas to be measured. Also, the gas sensor element 7 has electrode pads 25, 26, 27, 28, 29, and 30 formed on the outer surface of its rear end portion (an upper end portion in FIG. 1, a longitudinally rear end portion); i.e., on the front and back surfaces of the rear end portion; specifically, on a first main surface 21 and a second main surface 23 of the rear end portion (see FIGS. 2 and 3 for detail). The connection terminals 15 are electrically connected to the electrode pads 25, 26, 27, 28, 29, and 30, respectively, of the gas sensor element 7, and are also electrically connected to respective lead wires 35 extending into the gas sensor 1 from the outside. Thus, current paths are formed through which current flows between an external device connected to the lead wires 35, and the electrode pads 25, 26, 27, 28, 29, and 30.

The metallic shell 5 has an approximately tubular shape and is configured to have a through hole 37 extending therethrough in the direction of the axial line O and a ledge 39 protruding radially inward from the wall surface of the through hole 37. The metallic shell 5 holds the gas sensor element 7 inserted through the through hole 37 such that the detecting section 17 is disposed forward of the forward end of the through hole 37, while the electrode pads 25, 26, 27, 28, 29, and 30 are disposed rearward of the rear end of the through hole 37.

In the through hole 37 of the metallic shell 5, an annular ceramic holder 41, a talc ring 43, a talc ring 45, and the above-mentioned ceramic sleeve 9 are stacked rearward in this order so as to surround the circumference of the gas sensor element 7. A crimp packing 49 is disposed between the ceramic sleeve 9 and a rear end portion 47 of the metallic shell 5, while a metallic holder 51 for holding the talc rings 43 and 45 and the ceramic holder 41 is disposed between the ceramic holder 41 and the ledge 39 of the metallic shell 5. The rear end portion 47 of the metallic shell 5 is crimped so as to press the ceramic sleeve 9 forward through the crimp packing 49.

A protector 55 made of metal (e.g., stainless steel) and having a dual structure is attached to the outer circumference of a forward end portion 53 of the metallic shell 5 by, for example, welding and covers a protruding portion of the gas sensor element 7. An outer tube 57 is fixed to the outer circumference of a rear portion of the metallic shell 5, and a grommet 59 is disposed in a rear opening portion of the outer tube 57. The grommet 59 has lead wire insertion holes 61 formed therein, and the six lead wires 35 (FIG. 1 shows two of them) are inserted through the respective lead wire insertion holes 61 and are electrically connected to the electrode pads 25, 26, 27, 28, 29, and 30, respectively.

The first separator 13 has a collar portion 63 formed along its outer circumference, and the collar portion 63 is fixed to the outer tube 57 through a holding member 65. A second separator 67 held between the first separator 13 and the grommet 59 is disposed on the rear end side of the first separator 13, and rear end portions of the connection terminals 15 are inserted into the second separator 67.

1-2. Configuration of Gas Sensor Element

Next, the gas sensor element 7 will be described with reference to FIGS. 2 to 4.

Figure 2:
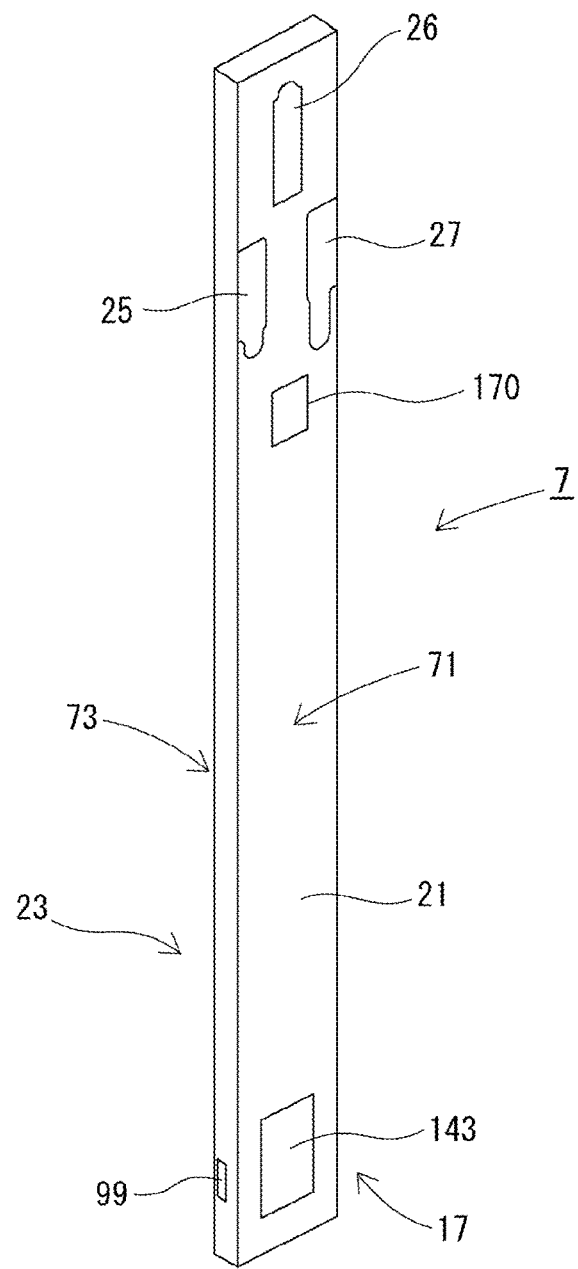
FIG. 2 is a perspective view schematically illustrating a gas sensor element in the gas sensor of FIG. 1.
Figure 2:
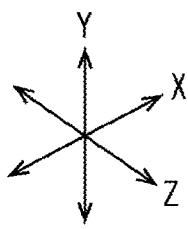
Figure 3:
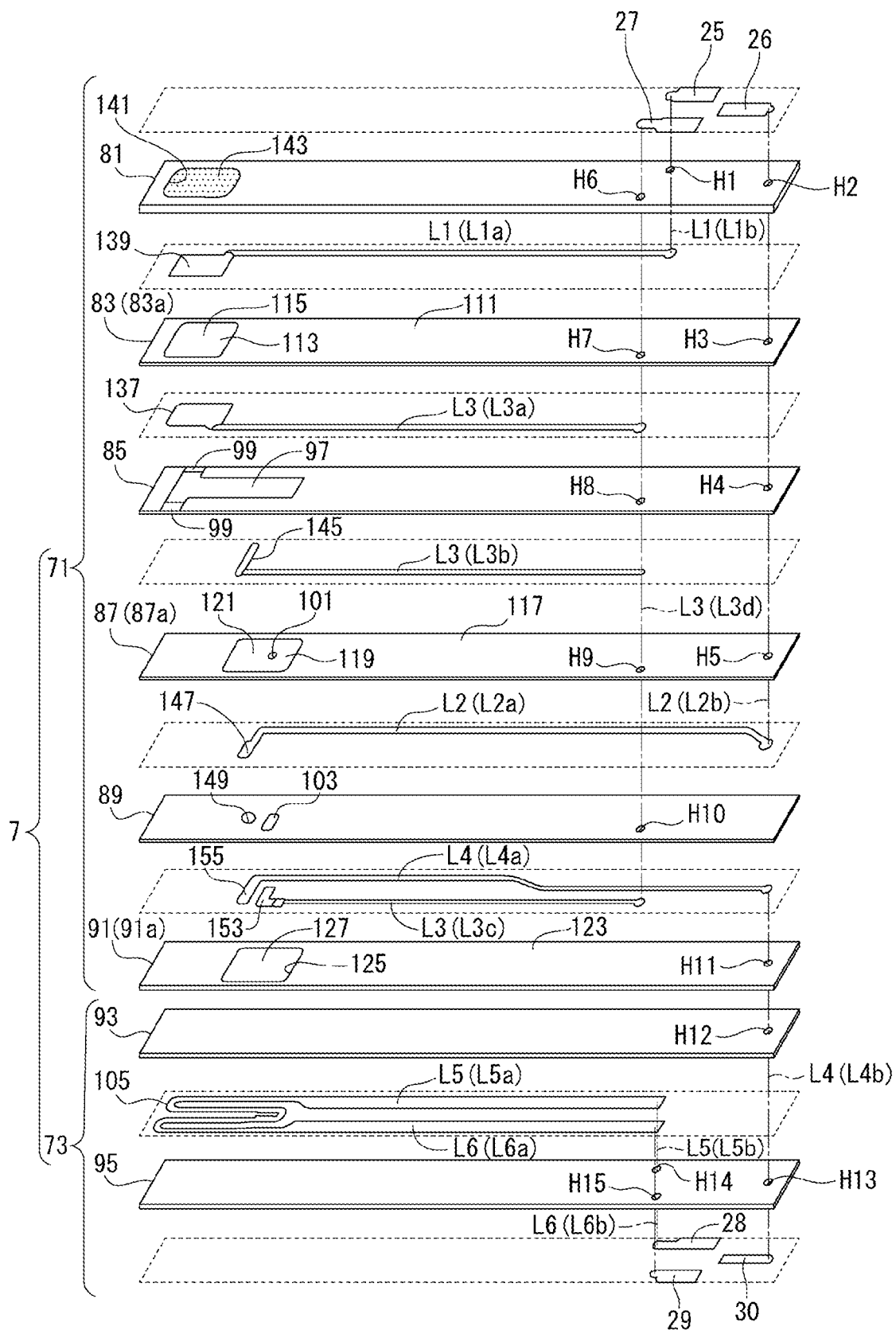
FIG. 3 is an exploded perspective view of a portion of the gas sensor of FIG. 1.
Figure 4:
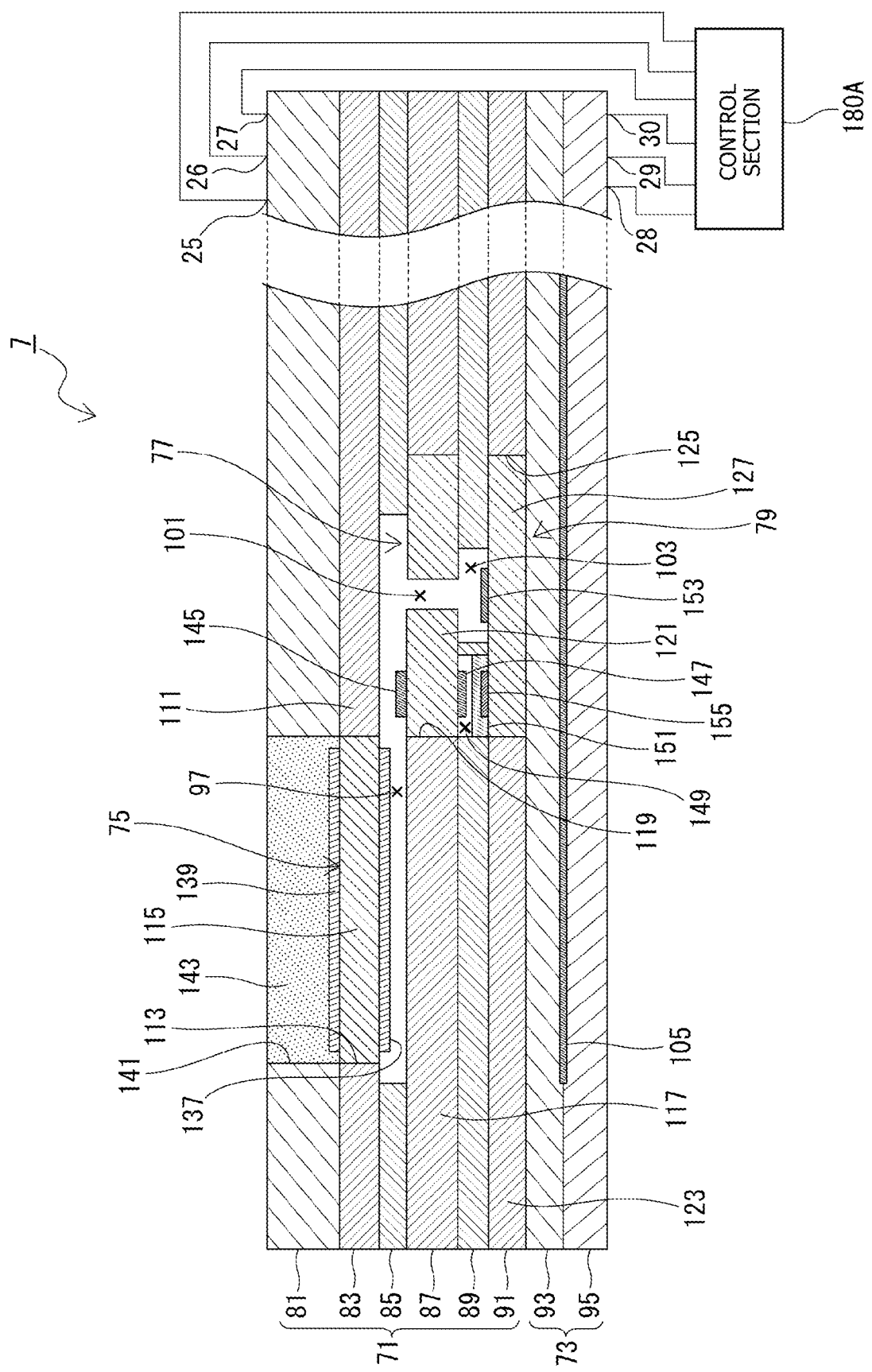
FIG. 4 is an explanatory sectional view of a forward end portion of the gas sensor element, the sectional view being obtaining by cutting the forward end portion in the stacking direction along the longitudinal direction of the gas sensor element and schematically showing the internal structure of the forward end portion of the gas sensor element.

In FIGS. 3 and 4, the left side corresponds to the forward end side of the gas sensor element 7, and the right side corresponds to the rear end side of the gas sensor element 7. In FIG. 2, the lower side corresponds to the forward end side of the gas sensor element 7, and the upper side corresponds to the rear end side of the gas sensor element 7. FIG. 4 omits the illustration of a longitudinally intermediate portion of the gas sensor element 7 and schematically shows electrical connections between the gas sensor element 7 and an external equipment (control section 180A).

As shown in FIG. 2, the gas sensor element 7 is an elongated plate member extending in the longitudinal direction (Y-axis direction). In FIG. 2, the longitudinal direction corresponds to the direction of the axial line O of the gas sensor. Also, the Z-axis direction in FIG. 2 corresponds to the direction of lamination perpendicular to the longitudinal direction, and the X-axis direction corresponds to the width direction perpendicular to the longitudinal direction and to the direction of lamination. The gas sensor element 7 has a rectangular-parallelepiped shape (plate shape) extending in the longitudinal direction and is configured such that a plate-shaped detection element section 71 extending in the longitudinal direction and a plate-shaped heater 73 extending in the longitudinal direction are laminated together.

The detection element section 71 has a structure in which a first insulation layer 81, a first ceramic layer 83, a second insulation layer 85, a second ceramic layer 87, a third insulation layer 89, and a third ceramic layer 91 are laminated in this order. The heater 73 has a structure in which a fourth insulation layer 93 and a fifth insulation layer 95 are laminated in this order. The first to third ceramic layers 83, 87, and 91 have a plate-like shape and extend in the longitudinal direction of the gas sensor element 7. A first measuring chamber 97 is formed between the first ceramic layer 83 and the second ceramic layer 87. A region of the first measuring chamber 97 on the forward end side communicates with the ambient atmosphere through two diffusion resistors 99 (see FIG. 3). Gas to be measured (exhaust gas) is introduced from the ambient atmosphere into the gas sensor element 7 through the diffusion resistors 99. The first measuring chamber 97 communicates, in its region on the rear end side, with a second measuring chamber 103 formed in the third insulation layer 89, through an introduction path 101 which is formed in the second ceramic layer 87 and will be described below. The diffusion resistors 99 are formed of a porous substance such as alumina and allow gas to flow therethrough.

A heat generating resistor 105 formed of an electrically conductive material such as tungsten is disposed between the fourth and fifth insulation layers 93 and 95. The heat generating resistor 105 partially constitutes the heater 73. When electric power is supplied to the heater 73 from an external power supply, the heat generating resistor 105 generates heat for heating the gas sensor element 7 (particularly, the detection element section 71) to a predetermined activation temperature, thereby enhancing oxygen ion conductivity of the solid electrolyte bodies and thus stabilizing operation.

As shown in FIGS. 3 and 4, the first ceramic layer 83 includes a plate-shaped first insulating ceramic portion 111 extending in the longitudinal direction, a first insertion hole 113 provided at a longitudinally forward end side and extending through the first insulating ceramic portion 111 in the thickness direction, and a plate-shaped first solid electrolyte portion 115 embedded in the first insertion hole 113. The second ceramic layer 87 includes a plate-shaped second insulating ceramic portion 117 extending in the longitudinal direction, a second insertion hole 119 provided at the longitudinally forward end side and extending through the second insulating ceramic portion 117 in the thickness direction, and a plate-shaped second solid electrolyte portion 121 embedded in the second insertion hole 119. The third ceramic layer 91 includes a plate-shaped third insulating ceramic portion 123 extending in the longitudinal direction, a third insertion hole 125 provided at the longitudinally forward end side and extending through the third insulating ceramic portion 123 in the thickness direction, and a third solid electrolyte portion 127 embedded in the third insertion hole 125.

As shown in FIGS. 3 and 4, the detection element section 71 has the first pump cell 75, the oxygen concentration detection cell 77, and the second pump cell 79.

The first pump cell 75 includes the first solid electrolyte portion 115 of the first ceramic layer 83 and a pair of electrodes (a first inner electrode 137 and a first counter electrode 139) disposed on the opposite sides of the first solid electrolyte portion 115. The first inner electrode 137 faces the first measuring chamber 97. The first inner electrode 137 and the first counter electrode 139 contain platinum as a main component. The first counter electrode 139 is covered with a porous portion 143 (e.g., alumina) embedded in that portion (opening portion 141) of the first insulation layer 81 which faces the first counter electrode 139. The porous portion 143 allows gas (e.g., oxygen) to flow therethrough.

The oxygen concentration detection cell 77 includes the second solid electrolyte portion 121 of the second ceramic layer 87, and a detection electrode 145 and a reference electrode 147 disposed on the opposite sides of the second solid electrolyte portion 121. The second solid electrolyte portion 121 corresponds to an example of the "solid electrolyte body," and the detection electrode 145 and the reference electrode 147 correspond to an example of the "pair of electrodes." The third insulation layer 89 has a reference oxygen chamber 149, which is a space formed at a portion thereof in contact with the reference electrode 147 and extending therethrough in the thickness direction thereof. A porous portion 151 (see FIG. 4) is disposed in that region of the reference oxygen chamber 149 which faces the third solid electrolyte portion 127, while the other region remains as a hollow space. The third insulation layer 89 also has a second measuring chamber 103, which is a space formed at a portion thereof located on the rear end side of the reference oxygen chamber 149 and extending therethrough in the thickness direction thereof. By applying a predetermined fixed weak current to the oxygen concentration detection cell 77, oxygen is transported through the oxygen concentration detection cell 77 from the first measuring chamber 97 to the reference oxygen chamber 149. Thus, the reference oxygen chamber 149 is maintained at a predetermined oxygen concentration. Accordingly, the reference oxygen chamber 149 provides a reference oxygen concentration.

The second pump cell 79 includes the third solid electrolyte portion 127, a second inner electrode 153 disposed on that surface of the third solid electrolyte portion 127 which faces the second measuring chamber 103, and a second counter electrode 155 disposed on that surface of the third solid electrolyte portion 127 which faces the reference oxygen chamber 149.

The electrodes 139, 137, 145, 147, 153, and 155 contain platinum as a main component. The three electrode pads 25, 26, and 27 are formed on the outer surface of a rear end portion of the first insulation layer 81, and the three electrode pads 28, 29, and 30 are formed on the outer surface of a rear end portion of the fifth insulation layer 95. As shown in FIG. 3, the first electrode pad 25 is electrically connected to the first counter electrode 139 through a first wiring unit L1 (L1a, L1b). The second electrode pad 26 is electrically connected to the reference electrode 147 through a second wiring unit L2 (L2a, L2b). The third electrode pad 27 is electrically connected to the first inner electrode 137, the detection electrode 145, and the second inner electrode 153 through a third wiring unit L3 (L3a, L3b, L3c, L3d). The fourth electrode pad 30 is electrically connected to the second counter electrode 155 through a fourth wiring unit L4 (L4a, L4b). The first heater electrode pad 28 is electrically connected to the heat generating resistor 105 through a first heater wiring unit L5 (L5a, L5b). The second heater electrode pad 29 is electrically connected to the heat generating resistor 105 through a second heater wiring unit L6 (L6a, L6b). Notably, in FIG. 3, symbols H1, H2, H3, H4, H5, H6, H7, H8, H9, H10, H11, H12, H13, H14, and H15 denote through holes.

The first ceramic layer 83 is a first-pump-cell composite ceramic layer composed of the first insulating ceramic portion 111 and the first solid electrolyte portion 115. The second ceramic layer 87 is a detection-cell composite ceramic layer composed of the second insulating ceramic portion 117 and the second solid electrolyte portion 121. The introduction path 101 is provided in the second solid electrolyte portion 121. The third ceramic layer 91 is a second-pump-cell composite ceramic layer composed of the third insulating ceramic portion 123 and the third solid electrolyte portion 127. The first to third solid electrolyte portions 115, 121, and 127 contain zirconia having oxygen ion conductivity as a main component. The first to fifth insulation layers 81, 85, 89, 93, and 95 and the first to third insulating ceramic portions 111, 117, and 123 contain electrically insulating alumina as a main component and are formed to have a density which prevents permeation (flow) of fluid such as gas.

Notably, the term "main component" indicates "a material whose content is 50 wt. % or more;" for example, the first to third solid electrolyte portions 115, 121, and 127 contain zirconia in an amount of 50 wt. % or more.

A record section 170 is formed on the gas sensor element 7. The record section 170 is a section in which information specific to the detection element section 71 is recorded. The information specific to the detection element section 71 is inherent characteristic information which allows setting the relation between a change in the temperature of the detection element section 71 and a change in the internal resistance between the pair of electrodes. The record section 170 may be formed using an information code such as QR code (registered trademark, a two-dimensional barcode) or data matrix code (information code in which the above-mentioned inherent characteristic information is recorded), and the inherent characteristic information may be represented by characters and/or symbols. The record section 170 may be formed by printing the information code or the characters and/or symbols directly on the surface of the gas sensor element 7, or by printing the information code or the characters and/or symbols on a label and attaching the label to the surface of the gas sensor element 7.

Figure 5:
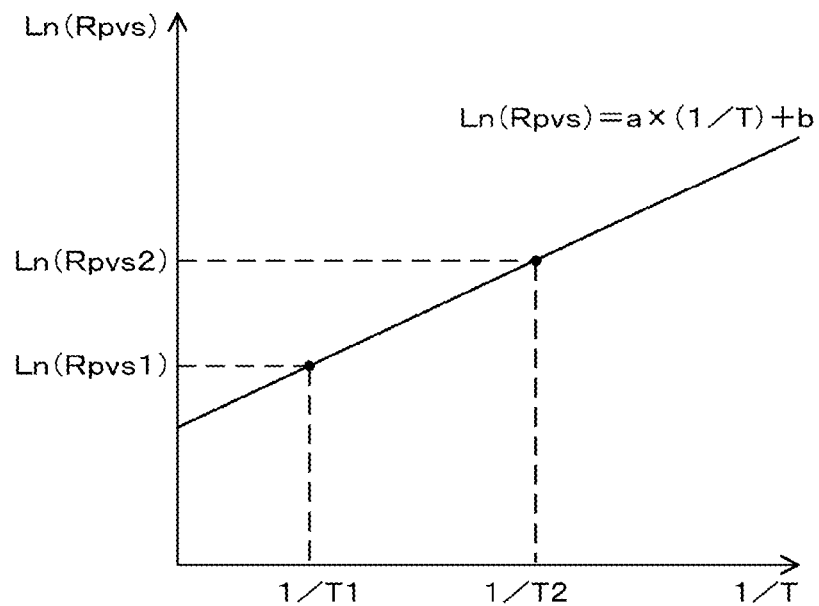
FIG. 5 is a graph illustrating a relational expression representing the relation between the temperature and internal resistance of the detection element section.

When the internal resistance of the detection element section 71, measured between the detection electrode 145 and the reference electrode 147 is denoted by Rpvs and the temperature of the detection element section 71 is denoted by T, as shown in FIG. 5, the relation between the internal resistance Rpvs and the temperature T can be represented by an equation (Arrhenius equation) of "$Ln(Rpvs)=a \times (1/T)+b$" including constants a and b. The inherent characteristic information recorded in the record section 170 is information which can embody this equation. For example, the inherent characteristic information contains first correspondence information which represents the correspondence between a first temperature T1 and an internal resistance Rpvs1 of the detection element section 71 when the temperature of the detection element section 71 is the first temperature T1, and second correspondence information which represents the correspondence between a second temperature T2 different from the first temperature T1 and an internal resistance Rpvs2 of the detection element section 71 when the temperature of the detection element section 71 is the second temperature T2. In this case, the values of the constants a and b can be determined by a first equation "$Ln(Rpvs1)=a \times (1/T1)+b$" obtained by substituting the first correspondence information (Rpvs1, T1) into the above-mentioned equation "$Ln(Rpvs)=a \times (1/T)+b$" and a second equation "$Ln(Rpvs2)=a \times (1/T2)+b$" obtained by substituting the second correspondence information (Rpvs2, T2) into the above-mentioned equation "$Ln(Rpvs)=a \times (1/T)+b$."

As described above, since the gas sensor 1 has the record section 170 in which the inherent characteristic information (which is specific to the detection element section 71 and allows setting the relation between a change in the temperature of the detection element section 71 and a change in the internal resistance between the pair of electrodes), the energization of the gas sensor 1 can be controlled by utilizing the inherent characteristic information recorded in the record section 170. Namely, it becomes possible to accurately control the energization of the heater 73 so as to heat the detection element section 71 to a desired temperature, once the "relation between the temperature and internal resistance of the detection element section 71" is specified, which relation is specific to the gas sensor 1. Notably, a specific method of controlling the gas sensor 1 will be described below.

1-3. Method of Manufacturing Gas Sensor

Figure 6:
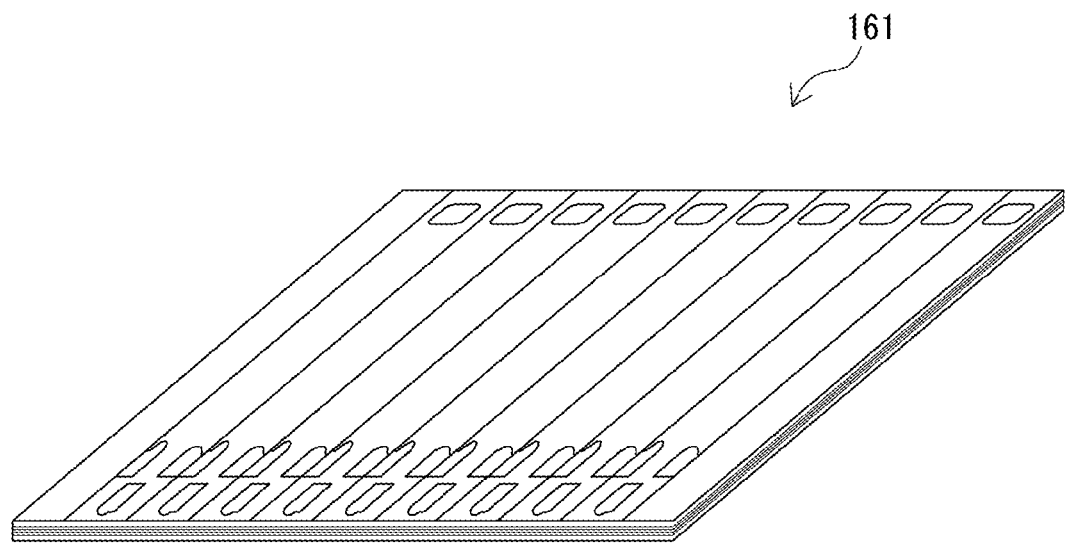
FIG. 6 is an explanatory view relating to a method of manufacturing compacts of gas sensor elements.

Next, a method of manufacturing the gas sensor 1 of the present embodiment will be briefly described with reference to FIGS. 3 and 6.

The following description refers to an example method of manufacturing the gas sensor 1 by laminating layers from the bottom layer shown in FIG. 3. However, the manufacturing procedure is not limited thereto.

<Step of Preparing Materials>

In manufacture of the gas sensor element 7 shown in FIG. 3, publicly known various lamination materials used to form the gas sensor element 7 are prepared; specifically, green insulation sheets which are to become the first to third insulating ceramic portions 111, 117, and 123 of the detection element section 71; green solid electrolyte sheets which are to become the first to third solid electrolyte portions 115, 121, and 127; a green insulation sheet which is to become the first insulation layer 81; and green insulation sheets which are to become the fourth and fifth insulation layers 93 and 95 of the heater 73. Specifically, in formation of the green insulation sheet, butyral resin and dibutyl phthalate are added to ceramic powder which predominantly contains alumina. Into the resultant mixture, a mixed solvent (toluene and methyl ethyl ketone) is mixed, thereby forming a slurry. The slurry is formed into a sheet by a doctor blade process, and the mixed solvent is volatilized, thereby yielding the green insulation sheet. Particularly, rectangular through holes corresponding to the planar shapes of the green solid electrolyte sheets used to form the first to third solid electrolyte portions 115, 121, and 127 are formed in the green insulation sheets which are to become the first to third insulating ceramic portions 111, 117, and 123.

That is, since the gas sensor element 7 is configured such that the first to third solid electrolyte portions 115, 121, and 127 are embedded in the insertion holes 113, 119, and 125 of the first to third insulating ceramic portions 111, 117, and 123, respectively, the through holes corresponding to the planar shapes of the insertion holes 113, 119, and 125 for the first to third solid electrolyte portions 115, 121, and 127 are formed beforehand in the green insulation sheets which are to become the first to third insulating ceramic portions 111, 117, and 123. Also, rectangular through holes corresponding to the opening portions 141 are formed in the green insulation sheet which is to become the first insulation layer 81. Notably, in the firing step, which will be described below, the shapes of the green insulation sheets and the through holes formed in the green insulation sheets slightly change (the shapes of green members also change after the firing step).

In forming the green solid electrolyte sheet, alumina powder, butyral resin, etc., are added to ceramic powder which predominantly contains zirconia. Into the resultant mixture, a mixed solvent (toluene and methyl ethyl ketone) is mixed, thereby forming a slurry. The slurry is formed into a sheet by a doctor blade process, and then the mixed solvent is volatilized, thereby yielding the green solid electrolyte sheet.

The green solid electrolyte sheet used to form the first to third solid electrolyte portions 115, 121, and 127 are cut into pieces having such rectangular shapes as to be tightly embedded into through holes (i.e., through holes having shapes corresponding to the insertion holes 113, 119, and 125) formed in the green insulation sheets which are to become the first to third insulating ceramic portions 111, 117, and 123.

Separately from the above preparation, a material used to form the second and third insulation layers 85 and 89 by firing is prepared as follows. Butyral resin and dibutyl phthalate are added to ceramic powder which predominantly contains alumina. Into the resultant mixture, a mixed solvent (toluene and methyl ethyl ketone) is mixed, thereby forming an alumina slurry.

Also, in order to form a green porous-member material used to form the diffusion resistors 99, the porous portion 143, the porous portion 151, and the like by firing, 100 mass % alumina powder, a burning-out material (e.g., carbon), and plasticizer are wet-mixed to form a porous-member material slurry in which the alumina powder, the burning-out material and plasticizer are dispersed. The plasticizer contains butyral resin and DBP.

By use of these materials, the gas sensor element 7 is manufactured as described below.

<Lamination Step>

First, heater patterns which are to become the heat-generating resistors 105 and the first and second heater lead portions L5a and L6a are formed on the surface (upper surface) of the green insulation sheet which is to become the fifth insulation layer 95 of the heater 73. In forming the heater patterns, platinum paste is formed which contains, for example, platinum as a main component and ceramic (e.g., alumina); then, the platinum paste is applied by printing to form the heater patterns.

Also, metalizing ink which contains, for example, platinum etc., is applied beforehand, by printing, onto the lower surface of the green insulation sheet in the shapes of the electrode pads 28, 29, and 30. Furthermore, holes which are to become the through holes H13, H14, and H15 are formed beforehand in the green insulation sheet which is to become the fifth insulation layer 95, and the metalizing ink is applied beforehand to the inner circumferential surfaces of the holes. Notably, since a method of forming the other through holes H1 to H15 and a method of applying metalizing ink are similar to those described above, a description thereof is omitted below.

Next, the green insulation sheet which is to become the fourth insulation layer 93 is laminated on that surface of the green insulation sheet used to form the fifth insulation layer 95 on which the heater patterns, etc., are formed such that the green insulation sheet which is to become the fourth insulation layer 93 covers the heater patterns.

Next, the green solid electrolyte sheet pieces which are to become the third solid electrolyte portions 127 are embedded into those through holes which are formed, in correspondence with the insertion holes 125, in the green insulation sheet which is to become the third insulating ceramic portion 123, thereby yielding the third composite sheet 91a (see FIG. 3) which is to become the third ceramic layer 91.

Next, the third composite sheet 91a which is to become the third ceramic layer 91 is laminated on the surface (upper surface) of the green insulation sheet which is to become the fourth insulation layer 93. The third composite sheet 91a may be formed at any time before the same is laminated (the same also applies to formation of the other first and second composite sheets 83a and 87a (see FIG. 3)).

Next, using the above-mentioned metalizing ink, electrode patterns which are to become the second inner electrodes 153 and the second counter electrodes 155 are formed by printing on the surface of the third composite sheet 91a. Also, using the above-mentioned platinum paste, lead patterns which are to become the fourth and fifth lead portions L3c and L4a are formed by printing. Notably, the material used to form the electrode patterns and the lead patterns are also applied to the case of the other ceramic layers 83 and 87. By using the above-mentioned alumina slurry, a layer which is to become the third insulation layer 89 is formed, by printing, on the surface (upper surface) of the third composite sheet 91a. In forming the layer, openings are formed at those portions of the layer which are to become the reference oxygen chambers 149 and the second measuring chambers 103. A porous-member material slurry is applied, by printing, at bottom portions of the openings which are to become the reference oxygen chambers 149, so as to form porous-member material slurry portions which are to become the porous portions 151. Also, carbon paste which serves as a burning-out material is applied, by printing, to the upper surfaces of the porous-member material slurry portions and to the openings which are to become the second measuring chambers 103.

Next, the green solid electrolyte sheet pieces which are to become the second solid electrolyte portions 121 are embedded into those through holes which are formed, in correspondence with the insertion holes 119, in the green insulation sheet which is to become the second insulating ceramic portion 117, thereby yielding the second composite sheet 87a which is to become the second ceramic layer 87. Next, through holes which are to become the introduction paths 101 are formed in the green solid electrolyte sheet pieces embedded in the second composite sheet 87a. Notably, carbon paste is charged into the formed through holes. Then, electrode patterns which are to become the detection electrodes 145, and lead patterns which are to become the third lead portions L3b, are formed on the upper surface of the second composite sheet 87a. Also, electrode patterns which are to become the reference electrodes 147, and lead patterns which are to become the second lead portions L2a, are formed on the lower surface of the second composite sheet 87a.

Next, the second composite sheet 87a having the above-mentioned electrode patterns formed thereon, etc., is laminated on the surface of the layer which is to become the third insulation layer 89. Next, using the alumina slurry, a layer which is to become the second insulation layer 85 is formed, by printing, on the surface (upper surface) of the second composite sheet 87a. In this layer, first openings are formed beforehand at positions where the diffusion resistors 99 are to be formed, and second openings are formed beforehand at positions where the first measuring chambers 97 are to be formed. A porous-member material slurry which is to become the diffusion resistors 99 is applied into the first openings by printing. Also, carbon paste is applied, by printing, into the second openings which are to become the first measuring chambers 97. The first and the second openings communicate with each other.

Next, the green solid electrolyte sheet pieces which are to become the first solid electrolyte portions 115 are embedded into those through holes which are formed, in correspondence with the insertion holes 113, in the green insulation sheet which is to become the first insulating ceramic portion 111, thereby yielding the first composite sheet 83a which is to become the first ceramic layer 83. Then, electrode patterns which are to become the first counter electrodes 139, and lead patterns which are to become the first lead portions L1a, are formed on the upper surface of the first composite sheet 83a. Also, electrode patterns which are to become the first inner electrodes 137, and lead patterns which are to become the third lead portions L3a, are formed on the lower surface of the first composite sheet 83a.

Next, the first composite sheet 83a having the above-mentioned electrode patterns formed thereon, etc., is laminated on the surface of the layer which is to become the second insulation layer 85. Next, the green insulation sheet which is to become the first insulation layer 81 is laminated on the surface of the first composite sheet 83a. Notably, porous-member material slurry is applied beforehand, by printing, into those through holes of the green insulation sheet which correspond to the opening portions 141. Also, the aforementioned metalizing ink is applied beforehand, by printing, onto the lower surface of the green insulation sheet in the shapes of the electrode pads 25, 26, and 27. The layers are laminated together as mentioned above, thereby forming a green laminate. Then, the green laminate is compressed at a pressure of 1 MPa, thereby yielding the green compact 161 shown in FIG. 6.

<Cutting Step>

Subsequently, the green compact 161 obtained as a result of the compression is cut into a plurality of (e.g., 10) pieces having a predetermined size, whereby a plurality of (e.g., 10) green laminates having approximately the same size as the gas sensor elements 7 are obtained.

<Firing Step>

Subsequently, the green laminates are debindered and are then subjected to regular firing at a temperature of 1,500° C. for one hour, thereby yielding the gas sensor elements 7.

<Measuring Step>

A measuring step is performed after the gas sensor element 7 has been obtained in the above-described manner. In the measuring step, a measurement is made to determine the first temperature T1, which is the temperature of the detection element section 71 at the time when the detection element section 71 is controlled such that the internal resistance becomes equal to the first internal resistance Rpvs1. Also, a measurement is made to determine the second temperature T2, which is the temperature of the detection element section 71 at the time when the detection element section 71 is controlled such that the internal resistance of the detection element section 71 becomes equal to the second internal resistance Rpvs2 different from the first internal resistance Rpvs1. Specifically, the temperature of the detection element section 71 at the time when the heating by the heater 73 is controlled by a controller similar to the control section 180A (which will be described below) such that the internal resistance of the detection element section 71 becomes equal to the first internal resistance Rpvs1 is measured using a known temperature measurement apparatus (for example, a thermocamera or the like). The temperature of the detection element section 71 measured when its internal resistance is equal to the first internal resistance Rpvs1 is taken as the first temperature T1. Furthermore, the temperature of the detection element section 71 at the time when the heating is controlled such that the internal resistance of the detection element section 71 becomes equal to the second internal resistance Rpvs2 different from the first internal resistance Rpvs1 is measured using the known temperature measurement apparatus (for example, a thermocamera or the like). The temperature of the detection element section 71 measured when its internal resistance is equal to the second internal resistance Rpvs2 is taken as the second temperature T2.

<First Recording Step>

A first recording step is performed after the measuring step is performed in the above-described manner. In the first recording step, on the basis of the first temperature and the second temperature measured in the measuring step, the inherent characteristic information (which is specific to the gas sensor and which allows setting of the relation between a change in the temperature of the detection element section 71 and a change in the internal resistance thereof) is recorded in the record section 170 integrated with the gas sensor 1 (record section attached to the gas sensor itself). The record section 170 may be formed using an information code such as a QR code (registered trademark, a two-dimensional barcode) or data matrix code (information code in which the above-mentioned inherent characteristic information is recorded), and the inherent characteristic information may be represented by characters and/or symbols. The record section 170 may be formed by printing the information code or the characters and/or symbols directly on the surface of the gas sensor element 7 or by printing the information code or the characters and/or symbols on a label, and attaching the label to the surface of the gas sensor element 7.

As described above, in the case of the gas sensor 1, the relation between the internal resistance Rpvs of the detection element section 71 (the internal resistance across the detection electrode 145 and the reference electrode 147) and the temperature T of the detection element section 71 can be represented by an equation (Arrhenius equation) "$\mathrm{Ln}(Rpvs)=a \times (1/T)+b$" including constants a and b, as shown in FIG. 5. The inherent characteristic information recorded in the record section 170 is information which can be represented by this equation. Specifically, the first correspondence information (T1, Rpvs1) and the second correspondence information (T2, Rpvs2) are recorded in the record section 170 as the inherent characteristic information. The first correspondence information (T1, Rpvs1) represents the correspondence between the above-described first temperature T1 and the internal resistance Rpvs1 of the detection element section 71 at the first temperature T1. The second correspondence information (T2, Rpvs2) represents the correspondence between the above-described second temperature T2 and the internal resistance Rpvs2 of the detection element section 71 at the second temperature T2. By virtue of recording of the inherent characteristic information, upon reading of the first correspondence information (T1, Rpvs1) and the second correspondence information (T2, Rpvs2) from the record section 170, the values of the constants a and b can be determined by the first equation "$\mathrm{Ln}(Rpvs1)=a \times (1/T1)+b$" obtained by substituting the first correspondence information (Rpvs1, T1) into the above-mentioned equation "$\mathrm{Ln}(Rpvs)=a \times (1/T)+b$" and the second equation "$\mathrm{Ln}(Rpvs2)=a \times (1/T2)+b$" obtained by substituting the second correspondence information (Rpvs2, T2) into the above-mentioned equation "$\mathrm{Ln}(Rpvs)=a \times (1/T)+b$."

<Aging Step>

After the first recording step, the following aging step is performed for the gas sensor element 7 having undergone the first recording step. When aging treatment is performed in the aging step, the gas sensor element 7 having undergone the first recording step is first heated to a previously set temperature range in a rich atmosphere whose moisture content is approximately constant. Electric power is supplied between the first inner electrode 137 and the first counter electrode 139 and between the second inner electrode 153 and the second counter electrode 155. The "rich atmosphere" refers to a gas atmosphere whose oxygen ratio is smaller than that of a gas atmosphere whose air-fuel ratio is equal to the stoichiometric air-fuel ratio ($\lambda=1$); namely, a gas atmosphere whose oxygen ratio is smaller (whose oxygen partial pressure is lower) as compared with a reference gas atmosphere whose air-fuel ratio is equal to the stoichiometric air-fuel ratio which is the mixing ratio of air and fuel for ideal complete combustion. The expression "moisture content is approximately constant" refers to a state in which a change in absolute humidity per hour is 8% or less. An example of the rich atmosphere used in this aging is a gas atmosphere which contains $H_2$ (several vol. %) and $N_2$ (balance) and whose moisture content is greater than 0 vol. % but not greater than 5 vol. %. Notably, another example of the rich atmosphere is a gas atmosphere which contains CO (1 vol. %), $CO_2$ (10 vol. %), and $N_2$ (balance) and whose moisture content is greater than 0 vol. % but not greater than 5 vol. %.

Figure 7:
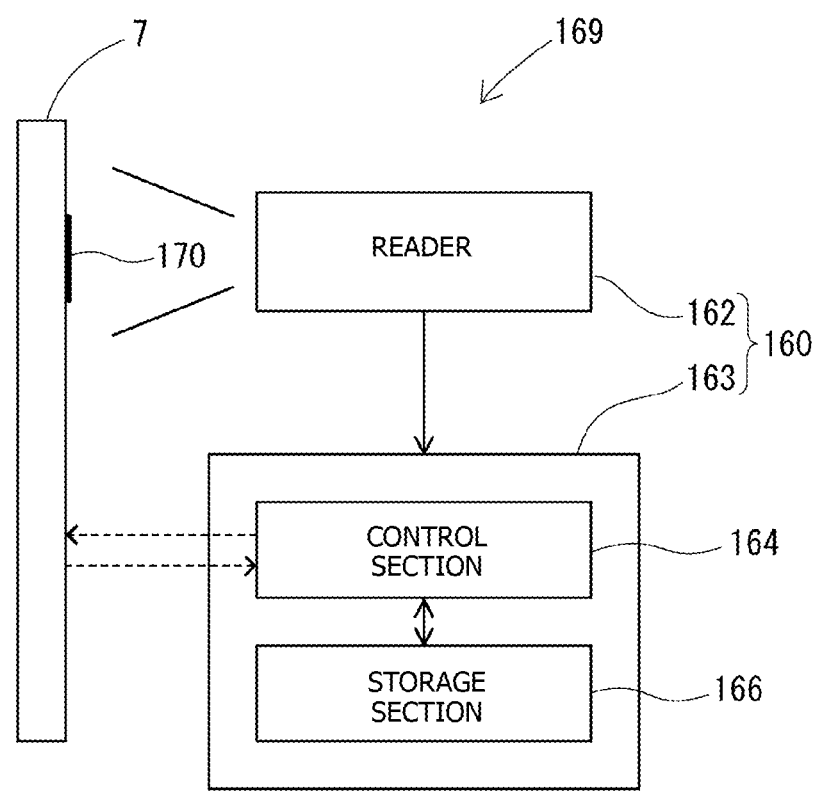
FIG. 7 is an explanatory view schematically illustrating some apparatuses used in an aging step.

In the aging step, temperature control is performed such that the temperature of the second pump cell 79 becomes equal to a desired target temperature Tta. Specifically, as shown in FIG. 7, the inherent characteristic information recorded in the record section 170 of the gas sensor element 7 is read using a reader 162 (for example, information code reader or the like). Notably, the step of reading the record section 170 using the reader 162 corresponds to an example of the reading step. A control section 164 obtains the inherent characteristic information read from the record section 170 by the reader 162. The control section 164 specifies the equation "$Ln(Rpvs)=a \times (1/T)+b$" (equation specific to the gas sensor element 7) based on the inherent characteristic information. The step in which the control section 164 specifies the above-described equation corresponds to an example of the relational expression setting step (step of setting a relational expression representing the relation between the temperature and internal resistance of the detection element section 71 based on the inherent characteristic information read in the reading step). After having specified the above-described equation (the relational expression representing the relation between the temperature and internal resistance of the detection element section 71 set based on the inherent characteristic information), the control section 164 stores information (for example, the values of the constants a and b) for specifying the equation in a storage section 166 corresponding to the relational expression storage section. Further, the control section 164 computes the internal resistance (target resistance) at the target temperature Tta based on the equation specified in the above-described manner. In this example, the control section 164 corresponds to an example of the specifying section, and obtains the target resistance based on the inherent characteristic information read by the reader 162.

In the aging step, the control section 164 supplies electric power between the second inner electrode 153 and the second counter electrode 155 while controlling the energization of the heater 73 such that the internal resistance becomes equal to the target resistance obtained in the above-described manner. Notably, the step in which the control section 164 controls the energization of the heater 73 in the aging step corresponds to an example of the control step (step of detecting the internal resistance of the detection element section 71 using the internal resistance detection section and controlling the energization of the heater using the energization control section based on the above-described relational expression and the internal resistance detected by the internal resistance detection section). In this example, the control section 164 functions as the internal resistance detection section, and detects the internal resistance between the pair of electrodes (between the detection electrode 145 and the reference electrode 147) by a known method. Further, the control section 164 functions as the energization control section and controls the energization of the heater 73, based on the above-described relational expression and the internal resistance detected by the internal resistance detection section, such that the internal resistance between the pair of electrodes (between the detection electrode 145 and the reference electrode 147) becomes equal to the above-described target resistance. Notably, the target temperature Tta in the aging step may be a desired temperature within the range of, for example, 550 to 700° C.

In this manner, the gas sensor element 7 having undergone the aging step is obtained. Notably, in the aging step, the reader 162 and a control apparatus 163 including the control section 164 and the storage section 166 function as a temperature control apparatus 160. Also, the gas sensor element 7 and the temperature control apparatus 160 function as a temperature control system 169.

<Assembling Step>

After having obtained the gas sensor element 7 in the above described manner, an assembling step of assembling the gas sensor element 7 into the metallic shell 5 is performed. In this assembling step, the gas sensor element 7 manufactured by the above-described method is inserted into the metallic holder 51; furthermore, the gas sensor element 7 is fixed in place by the ceramic holder 41 and the talc ring 43, thereby forming an assembly. Subsequently, while the assembly is fixed to the metallic shell 5, and a portion of the gas sensor element 7 on the rear end side in the direction of the axial line O is inserted through the talc ring 45 and the ceramic sleeve 9, the talc ring 45 and the ceramic sleeve 9 are inserted into the metallic shell 5.

Then, the rear end portion 47 of the metallic shell 5 is crimped to hold the ceramic sleeve 9, thereby yielding a lower assembly. The protector 55 is attached beforehand to the lower assembly. Meanwhile, the outer tube 57, the separator 13, the grommet 59, etc., are assembled together, thereby yielding an upper assembly. Then, the lower assembly and the upper assembly are joined together, thereby yielding a structure similar to the gas sensor 1 shown in FIG. 1.

<Second Recording Step>

After having fabricating a structure by joining the lower assembly and the upper assembly to the gas sensor element 7 in the assembly step, a record section 170 (see FIGS. 7 and 8) similar to the above-described record section 170 is formed on the outer surface of the structure (the metallic shell 5, the outer tube 57, etc.). The record section formed on the outer surface of the structure obtained in the assembling step may be the same as the record section 170, but may differ from the record section 170 to some extent so long as the above-described inherent characteristic information is recorded.

The above-described manufacturing method allows the gas sensor 1 to be manufactured so as to utilize the record section 170 in which the inherent characteristic information (which is specific to the detection element section, and which allows setting the relation between a change in the temperature of the detection element section 71 and a change in the internal resistance between the pair of electrodes). Accordingly, for the gas sensor 1, control utilizing the inherent characteristic information recorded in the record section 170 can be performed. Namely, it becomes possible to accurately control the energization of the heater 73 to heat the detection element section to a desired temperature, after specifying the "relation between the temperature and internal resistance of the detection element section" which is specific to the gas sensor 1.

Also, in the above-described manufacturing method, the recording step is performed so as to record the inherent characteristic information in the record section 170 attached to the gas sensor itself. Therefore, the inherent characteristic information representing the characteristics peculiar to the gas sensor 1 can be recorded while being related to the gas sensor itself. As a result, the management and utilization of the inherent characteristic information can be performed simply and easily in steps (for example, the aging step or a step after mounting of the gas sensor to a vehicle) subsequent to the recording step.

1-4. Operation of Gas Sensor

Next, operation of the above-described gas sensor 1 will be described in detail.

Figure 8:
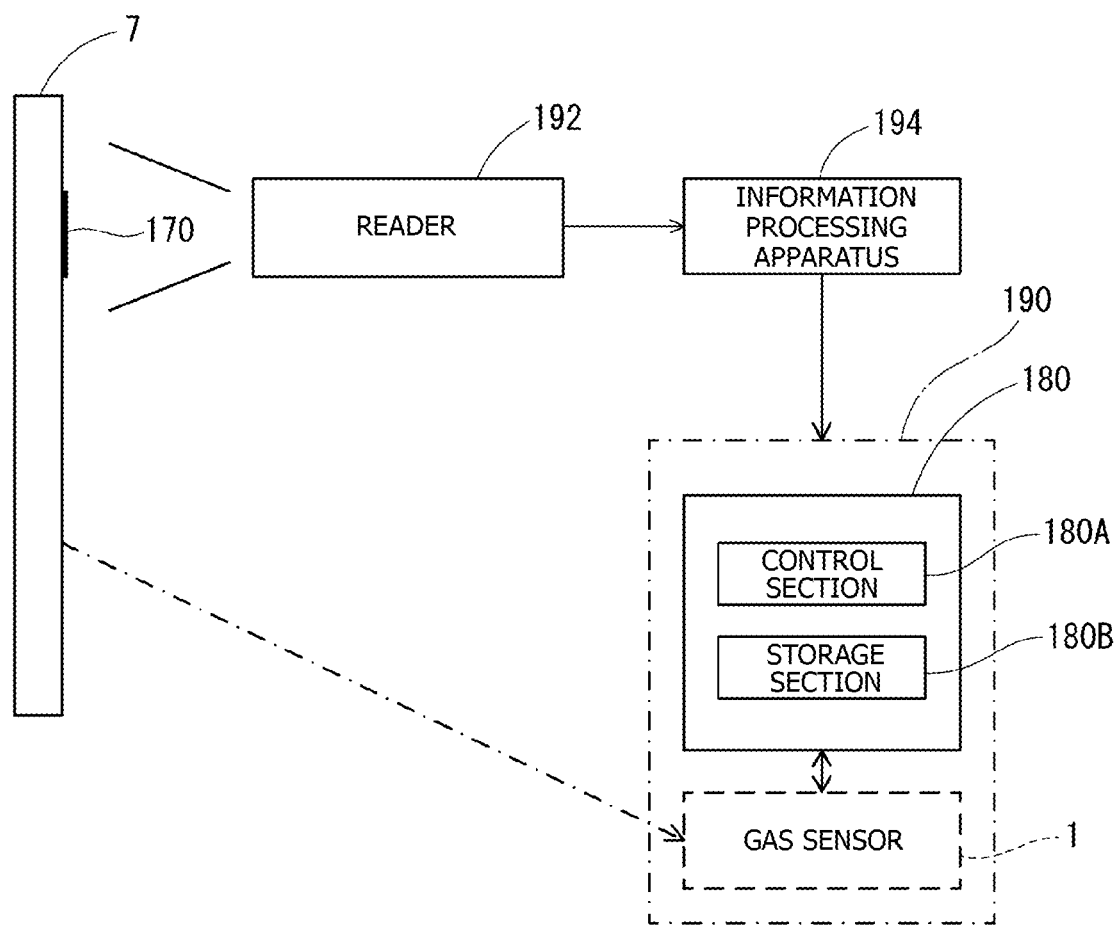
FIG. 8 is an explanatory view schematically illustrating apparatuses used in a step before mounting of the gas sensor to a vehicle and a system formed after mounting of the gas sensor to the vehicle.

A temperature control system 190 shown in FIG. 8 is a system mounted on the vehicle and mainly includes the gas sensor 1 and a temperature control apparatus 180. The temperature control system 190 is configured as a system which can realize a temperature control method which will be described below. The temperature control apparatus 180 is configured, for example, as an electronic control unit (ECU) to be mounted on the vehicle.

In the case where the temperature control system 190 shown in FIG. 8 is incorporated into the vehicle, first, a reading step is performed. In this reading step, the inherent characteristic information recorded in the record section 170 of the gas sensor 1 (for example, the record section 170 formed in the second recording step) is read by a reader 192.

A relational expression setting step is then performed after the reading step performed using the reader 192. This relational expression setting step is a step of setting a relational expression representing the relation between the temperature and internal resistance of the detection element section 71 based on the inherent characteristic information read in the reading step. Specifically, in this step, the mathematical equation "$Ln(Rpvs)=a \times (1/T)+b$" (mathematical equation specific to the gas sensor element 7) is set based on the inherent characteristic information which is read by the reader 192 from the record section. Notably, an information processing apparatus 194 may set the mathematical equation (relational expression) based on the information read by the reader 192. Alternatively, the control section 180A of the temperature control apparatus 180 may set the equation. For example, the information processing apparatus 194 is configured to transmit the inherent characteristic information read by the reader 192 (the inherent characteristic information recorded in the record section 170) to the control section 180A. Based on the information externally input as described above (the inherent characteristic information recorded in the record section 170), the control section 180A stores in a storage section 180B data specifying the above-described relational expression (information specifying the relation between the temperature and internal resistance of the detection element section 71 based on the inherent characteristic information, specifically, the expression "$Ln(Rpvs)=a \times (1/T)+b$"). Furthermore, the control section 180A functions as the specifying section, and obtains a target resistance based on the information (the above-described relational expression) stored in the storage section 180B (information storage section) as described above. Specifically, a target temperature is determined in advance, and an internal resistance at the target temperature is computed using the relational expression "$Ln(Rpvs)=a \times (1/T)+b$" specified by the information stored in the storage section 180B, and the computed internal resistance is used as the target resistance.

As described above, the temperature control apparatus 180 with information stored therein can be incorporated into the vehicle. The gas sensor 1 is also incorporated into the vehicle as a component to be controlled by the temperature control apparatus 180. A control step is performed in a state in which the temperature control apparatus 180 and the gas sensor 1 have been incorporated into the vehicle. In this control step, while the internal resistance of the detection element section 71 (specifically, the internal resistance between the detection electrode 145 and the reference electrode 147) is measured by the internal resistance detection section (specifically, the control section 180A), the energization of the heater 73 is controlled by the energization control section (specifically, the control section 180A) based on the above-described relational expression and the internal resistance detected by the internal resistance detection section such that the internal resistance between the detection electrode 145 and the reference electrode 147 becomes equal to the target resistance.

More specifically, when the control section 180A starts as a result of startup of the vehicle engine, the control section 180A supplies electric power to the heater 73. As a result, the heater 73 heats the first pump cell 75, the oxygen concentration detection cell 77, and the second pump cell 79 to an activation temperature. At that time, the control section 180A controls energization of the heater 73, while detecting the internal resistance between the detection electrode 145 and the reference electrode 147 using the internal resistance detection section (the control section 180A) such that the solid electrolyte portions 115, 121, and 131 (in the present embodiment, the solid electrolyte portion 121) are heated to the target temperature (specifically, such that the internal resistance between the detection electrode 145 and the reference electrode 147 becomes equal to the above-described target resistance).

After the cells 75, 77, and 79 have been heated to the activation temperature, the control section 180A supplies current (first pumping current Ip1) to the first pump cell 75. As a result, the first pump cell 75 pumps oxygen to or from the gas to be measured (exhaust gas) which has flowed into the first measuring chamber 97, by causing oxygen to move between the first inner electrode 137 and the first counter electrode 139 through the first solid electrolyte portion 115.

The control section 180A controls the first pumping current Ip1 supplied to the first pump cell 75 such that the interelectrode voltage (terminal-to-terminal voltage) of the oxygen concentration detection cell 77 becomes equal to a fixed voltage V1 (e.g., 425 mV). The voltage of the oxygen concentration detection cell 77 assumes a value corresponding to the oxygen concentration at the detection electrode 145, with the oxygen concentration of the reference oxygen chamber 149 serving as a reference. By virtue of this control, the oxygen concentration within the first measuring chamber 97 is adjusted to a level at which $NO_x$ does not decompose.

The gas to be measured whose oxygen concentration has been adjusted in the first measuring chamber 97 flows to the second measuring chamber 103 through the introduction path 101 of the second solid electrolyte portion 121. The control section 180A applies an interelectrode voltage (terminal-to-terminal voltage) to the second pump cell 79. This voltage is set to such a fixed voltage (voltage higher than the control voltage for the oxygen concentration detection cell 77; for example, 450 mV) as to decompose $NO_x$ gas contained in the gas to be measured into oxygen and nitrogen. As a result, $NO_x$ contained in the gas to be measured is decomposed into nitrogen and oxygen.

The control section 180A supplies current (second pumping current Ip2) to the second pump cell 79 so as to pump out oxygen generated as a result of decomposition of $NO_x$ from the second measuring chamber 103. Since the second pumping current Ip2 and the $NO_x$ concentration are in proportional relation, by means of detecting the value of the second pumping current Ip2, the $NO_x$ concentration of the gas to be measured can be detected.

Notably, the gas sensor element 7 is connected to an external equipment (the control section 180A) through the connection terminals 15 and the lead wires 35. The control section 180A supplies electric power for heat generation to the heater 73 and exchanges signals with the cells (the first pump cell 75, the oxygen concentration detection cell 77, and the second pump cell 79) of the element section 71, thereby controlling the gas sensor element 7.

In the present embodiment, the control section 180A is an electronic circuit formed by using an operational amplifier, etc. The control section 180A may be formed using a computer having CPU, a memory, etc.

As described above, in the temperature control apparatus 180 described above, the relational expression representing the relation between the temperature and internal resistance of the detection element section 71 set based on the inherent characteristic information (which is specific to the detection element section and which allows setting the relation between a change in the temperature of the detection element section and a change in the internal resistance between the pair of electrodes) recorded in the record section 170 of the gas sensor 1 to be controlled is stored in the relational expression storage section. Therefore, the "relation between the temperature and internal resistance of the detection element section" which is specific to the gas sensor 1 which is to be controlled can be accurately specified based on the relational expression stored in the relational expression storage section. Since the energization control section can control the energization of the heater 73 based on the relational expression and the internal resistance (the internal resistance between the pair of electrodes) detected by the internal resistance detection section, it is possible to accurately control energization of the heater 73 to heat the detection element section to a desired temperature, once the relation specific to the gas sensor 1 to be controlled (the relation between the temperature of the detection element section and the internal resistance between the pair of electrodes) is accurately specified and the internal resistance is actually detected using the internal resistance detection section.

Notably, the "gas sensor" which is one aspect of the present invention may have a configuration similar to that of the above-described gas sensor 1 or a configuration similar to that of the above-described gas sensor element 7.

Furthermore, the above-described temperature control apparatus 180 includes the information storage section (the storage section 180B) for storing externally input information (information specifying the relation between the temperature and internal resistance of the detection element section based on the inherent characteristic information recorded in the record section), and the specifying section (the control section 180A) for obtaining the target resistance based on the information stored in the information storage section. The temperature control apparatus 180 can store in the information storage section the "information which specifies the relation between the temperature and internal resistance of the detection element section" based on the inherent characteristic information recorded in the record section 170. The temperature control apparatus 180 can determine the target resistance based on the information stored in the information storage section. Namely, it is possible to simply and accurately perform the operation of obtaining the target resistance for attaining the desired temperature, once the relation specific to the gas sensor 1 to be controlled (the relation between the temperature of the detection element section and the internal resistance between the pair of electrodes) is accurately specified.

In the temperature control apparatus 180, the relational expression is a mathematical equation represented by an equation "$Ln(Rpvs)=a \times (1/T)+b$" in which Rpvs represents the internal resistance of the detection element section 71 and T represents the temperature of the detection element section 71 and which contains constants a and b. The inherent characteristic information is information which specifies at least the values of the constants a and b. Thus, the relation between the internal resistance Rpvs and temperature T of the detection element section 71 in the gas sensor 1 to be controlled can be approximated by the mathematical equation "$Ln(Rpvs)=a \times (1/T)+b$." In addition, the values of the constants a and b can be specified as values specific to the gas sensor. Namely, it is possible to more simply realize a configuration which can accurately control the energization of the heater 73 when the temperature of the gas sensor 1 is controlled; i.e., a configuration which can control the energization of the heater 73 based on the specific approximate formula which can more accurately specify the relation between the internal resistance Rpvs and temperature T of the gas sensor 1, whereby energization of the heater 73 can be accurately controlled such that a desired temperature is attained.

In the temperature control apparatus 180, the inherent characteristic information contains the first correspondence information which represents the correspondence between the first temperature T1 and the internal resistance Rpvs1 of the detection element section 71 when the temperature of the detection element section 71 is the first temperature T1, and the second correspondence information which represents the correspondence between the second temperature T2 different from the first temperature T1 and the internal resistance Rpvs2 of the detection element section 71 when the temperature of the detection element section 71 is the second temperature T2. Since the inherent characteristic information contains the above-described first correspondence information and the above-described second correspondence information, when the relational expression representing the relation between the temperature and internal resistance of the detection element section 71 is set based on the inherent characteristic information, the relational expression becomes an accurate expression specific to the gas sensor.

Other Embodiments

The present invention is not limited to the above embodiments, and may assume various other forms without departing from the spirit of the invention. For example, in order to solve, partially or entirely, the above-mentioned problem or yield, partially or entirely, the above-mentioned effects, technical features of the embodiment corresponding to technical features of the modes described in the section "Summary of the Invention" can be replaced or combined as appropriate. Also, technical feature(s) may be eliminated as appropriate unless the present specification mentions that such technical feature is essential. For example, possible modifications include the following.

In the above-described embodiment, in the recording step, the inherent characteristic information which is information specific to the gas sensor is recorded in the record section integrated with the gas sensor. However, the inherent characteristic information may be recorded in a record section provided separately from the gas sensor. For example, in the case where a serial number or lot number is printed on a gas sensor and the inherent characteristic information regarding the gas sensor and the above-mentioned serial number or lot number are stored in a record section provided separately from the gas sensor (for example, the storage section of the information processing apparatus) such that the inherent characteristic information is related to the serial number or lot number, the inherent characteristic information which is related to the serial number or lot number printed on the gas sensor can be read by referring to the record section (for example, the storage section of the information processing apparatus), whereby the inherent characteristic information can be utilized as in the above-described embodiment. Alternatively, in the case where a plurality of gas sensors are manufactured successively, individual inherent characteristic information representing the plurality of gas sensors may be successively stored in the record section provided separately from the gas sensors (for example, the storage section of the information processing apparatus). In this case, the correspondence between the individual inherent characteristic information and the plurality of gas sensors can be specified.

In the above-described embodiment, the inherent characteristic information contains the first correspondence information and the second correspondence information. However, the inherent characteristic information may be any information from which the values of the constants a and b of the above-described relational expression can be specified. For example, the inherent characteristic information may contain information representing the first temperature $T1$, the internal resistance $Rpvs1$ at the first temperature $T1$, and the value of either of the constants a and b. For example, when information representing the first temperature $T1$, the internal resistance $Rpvs1$ at the first temperature $T1$, and the value of the constant a are contained in the inherent characteristic information, the above-described relational expression can be accurately specified based on the inherent characteristic information.

In the above-described embodiment, both the first recording step and the second recording step are performed. However, only one of the first recording step and the second recording step may be performed. The record section 170 may be provided only on the gas sensor element 7 or only on a component attached to the gas sensor element 7.

In the above-described embodiment, the temperature control apparatus 180 is configured to store in the storage section 180B (the information storage section) the externally input information (information specifying the relation between the temperature and internal resistance of the detection element section based on the inherent characteristic information recorded in the record section 170). However, the embodiment may be modified such that, when the inherent characteristic information recorded in the record section 170 is input from the information processing apparatus 194, the inherent characteristic information is stored in the storage section 180B (the information storage section). In the case where the inherent characteristic information itself is stored in the storage section 180B as described above, the control section 180A can read the inherent characteristic information and specify the above-described relational expression.

In the above-described embodiment, the first temperature (the temperature of the detection element section when its internal resistance is controlled to the first internal resistance) and the second temperature (the temperature of the detection element section when its internal resistance is controlled to the second internal resistance) are measured. However, the embodiment may be modified to measure the temperature and internal resistance of the detection element section at predetermined first and second timings, and to use the temperature at the first timing as the first temperature, the internal resistance at the first timing as the first internal resistance, the temperature at the second timing as the second temperature, and the internal resistance at the second timing as the second internal resistance. However, before the above-mentioned Arrhenius equation is specified, although the control based on internal resistance is readily accomplished, it is difficult to control the temperature of the detection element section to a desired temperature. Therefore, the internal resistance of the detection element section is preferably controlled to the first internal resistance and the second internal resistance and the temperature of the detection element section is measured at that time. In this case, the calculation becomes simple, because the Arrhenius equation can be specified in a state in which the values of the first internal resistance and the second internal resistance are constant.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application No. JP 2018-121613 filed Jun. 27, 2018, the entire disclosure of which is incorporated herein by reference in its entirety.

What is claimed is:

1. A temperature control apparatus for controlling temperature of a gas sensor including a detection element section and a heater for heating the detection element section, the detection element section including a solid electrolyte body and a pair of electrodes disposed on the solid electrolyte body, wherein the gas sensor has an information code in which inherent characteristic information is recorded, the inherent characteristic information being information specific to the detection element section and which specifies a relation between a temperature and an internal resistance of the detection element section and allows setting a relation between a change in the temperature of the detection element section and a change in the internal resistance of the detection element section between the pair of electrodes, wherein the temperature control apparatus comprises:
a memory; and
a processor configured to:
receive the inherent characteristic information,
modify at least one parameter of a relational expression which represents the relation between the temperature and the internal resistance of the detection element section based on the inherent characteristic information,
store the modified relational expression in the memory,
detect the internal resistance between the pair of electrodes, and
control energization of the heater based on the modified relational expression and the internal resistance detected by the processor.

2. The temperature control apparatus as claimed in claim 1, further comprising:
an information code reader for reading the inherent characteristic information recorded in the information code; and
wherein the processor is further configured to obtain a target resistance based on the inherent characteristic information read by the information code reader.

3. The temperature control apparatus as claimed in claim 1, wherein the memory is further configured to store externally input information which is the inherent characteristic information recorded in the information code or information which specifies the relation between the temperature and internal resistance of the detection element section based on the inherent characteristic information; and
wherein the processor is further configured to obtain a target resistance based on the information stored in the memory.

4. The temperature control apparatus as claimed in claim 1, wherein the relational expression is a mathematical equation represented by an equation $Ln(Rpvs)=a\times(1/T)+b$, where Rpvs represents the internal resistance of the detection element section, T represents the temperature of the detection element section, and a and b are constants, and
the inherent characteristic information is information which specifies at least values of the constants a and b.

5. The temperature control apparatus as claimed in claim 1, wherein the inherent characteristic information contains:
first correspondence information which represents a correspondence between a first temperature and an internal resistance of the detection element section when the temperature of the detection element section is at the first temperature, and
second correspondence information which represents a correspondence between a second temperature different from the first temperature and an internal resistance of the detection element section when the temperature of the detection element section is at the second temperature.

6. A temperature control method for controlling temperature of a gas sensor including at least a detection element section and a heater for heating the detection element section, the detection element section including a solid electrolyte body and a pair of electrodes disposed on the solid electrolyte body,
wherein the gas sensor has an information code in which inherent characteristic information is recorded, the inherent characteristic information being information specific to the detection element section and which specifies a relation between a temperature and an internal resistance of the detection element section and allows setting a relation between a change in the temperature of the detection element section and a change in the internal resistance of the detection element section between the pair of electrodes,
wherein the temperature control method comprises:
a reading step of reading the inherent characteristic information recorded in the information code using an information reader;
a relational expression modifying step of modifying at least one parameter of a relational expression based on the relation between the temperature and internal resistance of the detection element section specified by the inherent characteristic information read in the reading step; and
a control step of detecting the internal resistance of the detection element section using a processor and controlling energization of the heater using the processor based on the modified relational expression and the internal resistance detected by the processor.

7. A gas sensor comprising:
a detection element section including a solid electrolyte body and a pair of electrodes disposed on the solid electrolyte body; and
a heater for heating the detection element section,
wherein the gas sensor has an information code in which inherent characteristic information is recorded, the inherent characteristic information being information specific to the detection element section and which specifies a relation between a temperature and an internal resistance of the detection element section and allows modification of at least one parameter of a relational expression based on the relation between the temperature and the internal resistance of the detection element section.

8. A method for manufacturing a gas sensor including at least a detection element section and a heater for heating the detection element section, the detection element section including one or more cells each having a solid electrolyte body and a pair of electrodes disposed on the solid electrolyte body,
the method comprising:
a measuring step of measuring a first temperature which is a temperature of the detection element section when the detection element section has a first internal resistance and a second temperature which is a temperature of the detection element section when the detection element section has a second internal resistance different from the first internal resistance; and
a recording step of recording inherent characteristic information in an information code integrated with the gas sensor or an information code provided separately from the gas sensor based on the first and second temperatures measured by the measurement step, the inherent characteristic information being information specific to the gas sensor and which specifies a relation between a temperature and an internal resistance of the detection element section and allows modification of at least one parameter of a relational expression based on the relation between the temperature and the internal resistance of the detection element section.

9. The method for manufacturing a gas sensor as claimed in claim 8, wherein in the recording step, the inherent characteristic information is recorded in the information code attached to the gas sensor itself.

10. A temperature control system for a gas sensor comprising:

a gas sensor; and
a temperature control apparatus,
the gas sensor comprising:
a detection element section including a solid electrolyte body and a pair of electrodes disposed on the solid electrolyte body; and
a heater for heating the detection element section,
wherein the gas sensor has an information code in which inherent characteristic information is recorded, the inherent characteristic information being information specific to the detection element section and which specifies a relation between a temperature and an internal resistance of the detection element section and allows setting a relation between a change in the temperature of the detection element section and a change in the internal resistance of the detection element section between the pair of electrodes, and
the temperature control apparatus comprising:
a memory; and
a processor configured to:
receive the inherent characteristic information,
modify at least one parameter of a relational expression which represents the relation between the temperature and the internal resistance of the detection element section based on the inherent characteristic information,
store the modified relational expression in the memory,
detect the internal resistance between the pair of electrodes, and
control energization of the heater based on the modified relational expression and the internal resistance detected by the processor.

\* \* \* \* \*